3,801,582
HALOPYRIDINE SULFONIC ACIDS
Penelope B. Domenico, Danville, Calif., assignor to The Dow Chemical Company, Midland, Mich.
No Drawing. Filed May 18, 1972, Ser. No. 254,628
Int. Cl. C07d 31/48
U.S. Cl. 260—294.8 R     8 Claims

ABSTRACT OF THE DISCLOSURE

Compounds corresponding to the formula

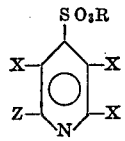

wherein X represents chloro or bromo; Z represents hydrogen, chloro or bromo and R represents hydrogen, alkali metal, lower alkyl of 1 to 4 carbon atoms, phenyl or chlorophenyl are prepared. The compounds have been found to be effective toxicant agents in the control of various bacterial, fungal and plant pests.

---

SUMMARY OF THE INVENTION

The present invention is directed to compounds corresponding to the formula

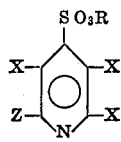

In this and succeeding formulae, X represents chloro or bromo; Z represents hydrogen, chloro or bromo and R represents hydrogen, alkali metal, loweralkyl of 1 to 4 carbon atoms, phenyl, or chlorophenyl. These compounds have been found to be effective toxicants for the control of various fungal and plant pets.

In the present specification and claims, the term "alkali metal" is employed to designate sodium, potassium or lithium.

In the present specification and claims, the term "lower alkyl" is employed to designate straight chain, branched chain or cyclic alkyl groups of 1 to 4 carbon atoms, namely, methyl, ethyl, n-propyl, isopropyl, cyclopropyl, n-butyl, secondary butyl, isobutyl, tertiary butyl and cyclobutyl.

The compounds of the present invention are crystalline solids or oil which are slightly soluble in water and of varied solubility in common organic solvents.

The pyridine compounds of the present invention are prepared by a variety of methods depending on the R substituent, for example. when preparing compounds wherein R is an alkali metal, an appropriate polyhalopyridine sulfonic acid containing the sulfonic acid group in the 4-ring position is neutralized with a base such as an alkali metal hydroxide or if desired with an alkali metal alkoxide in the corresponding alcohol. Examples would be aqueous sodium hydroxide or sodium methylate in methanol. The alkali metal salt may be isolated by concentrating the solution until crystallization occurs. Some alkali metal salts such as the sodium salt of many of these sulfonic acids are only slightly soluble in water and thus precipitate immediately.

The salts may be purified if desired by crystallization from water or lower alcohols.

The compounds wherein the R substituent is hydrogen are prepared by oxidizing an appropriate polyhalopyridine compound containing a mercapto (—SH) group in the 4-ring position to a sulfonic acid group by oxidation with fuming nitric acid or a mixture of 1 part of sulfuric acid and 2 parts of fuming nitric acid. Upon completion of the reaction, the solution is concentrated by flash evaporation and the residue poured into water. The solid product which separates is filtered off and dried.

The compounds wherein the R substituent is loweralkyl, phenyl or chlorophenyl are prepared by reacting an appropriate polyhalo-4-pyridine sulfonyl chloride with an appropriate lower alkanol or phenol in the presence of an inert reaction medium and an HCl acceptor under reflux temperature conditions for from about 2 to about 6 hours.

Representative inert reaction medium include, for example, chloroform, carbon tetrachloride, methylene dichloride, benzene, dimethyl formamide and the like. Representative hydrogen chloride acceptors include, for example, pyridine or triethylamine.

Upon completion of the reaction, the reaction mixture is cooled and filtered to recover the solid product. If desired the product can be purified by methods hereinabove described.

DESCRIPTION OF SOME PREFERRED EMBODIMENTS

The following examples illustrate the present invention and the manner by which it can be practiced but, as such, should not be construed as limitations upon the overall scope of the same.

EXAMPLE I 2,3,4,6-tetrabromo-4-pyridine sulfonic acid: sodium salt

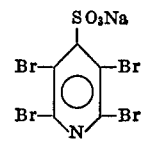

To 40 milliliters of red fuming nitric acid maintained under agitation and at a temperature of about minus 15° C. was slowly added 9.1 grams (0.021 mole) of 2,3,5,6-tetrabromo-4-mercapto pyridine over a period of about 10 minutes. Agitation was ceased and the mixture was allowed to stand for about one hour to let the mixture come to room temperature. Agitation was resumed and the mixture heated to 90° C. over a period of 90 minutes. The reaction mixture was poured into ice water, stirred and the solid 2,3,5,6-tetrabromo-4-nitro pyridine filtered off. The filtrate was neutralized with concentrated sodium hydroxide and the solid 2,3,5,6-tetrabromo-4-pyridine sulfonic acid; sodium salt which precipitated was recovered by filtration. The product melted at >250° C. and was found upon analysis to have carbon, bromine, nitrogen, sulfur and sodium contents of 11.88, 63.77, 2.83, 6.28 and 4.55 percent, respectively, as compared with the theoretical contents of 12.04, 64.4, 2.82, 6.44 and 4.63 percent, respectively, calculated for the above named structure.

EXAMPLE II 2,3,5,6-tetrachloro-4-pyridine sulfonic acid

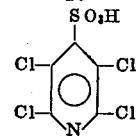

To 200 milliliters of fuming nitric acid at a temperature of 50° C. was added over a 10 minute period 30 grams (0.12 mole) of 2,3,5,6-tetrachloro-3-mercaptopyridine. After addition was complete, the reaction mixture was agitated for 10 minutes. The mixture was thereafter flash evaporated to remove about one-third of the acid. The mixture was poured into ice water and the solid 2,3,5,6-tetrachloro-4-pyridine sulfonic acid product was recovered as the dihydrate in a yield of 71.4 percent of theoretical by filtration and dried. The product melted at ~265° C. and was found by analysis to have carbon, hydrogen, chlorine and sulfur contents of 17.97, 1.90, 42.56 and 9.3 percent, respectively, as compared with the theoretical contents of 18.00, 1.51, 42.5 and 9.6 percent, respectively, calculated for the above named structure.

EXAMPLE III 2,3,5-trichloro-4-pyridine sulfonic acid

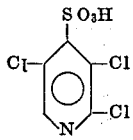

To 40 milliliters of fuming nitric acid maintained under agitation was slowly added 10 grams (0.5 mole) of 2,3,5-trichloro-4-mercapto pyridine. The mixture was heated to 90° C. and maintained at this temperature and under agitation for ~1¼ hours. The mixture was thereafter poured over ice. The solid which precipitated was recovered by filtration and treated with hot hexane. A small amount dissolved. The rest was added to methylene dichloride, dried and the methylene dichloride removed, leaving the 2,3,5-trichloro-4-pyridine sulfonic acid product, as the dihydrate. The product was recovered in a yield of 22 percent of theoretical. The product melted above 250° C. and upon analysis was found to have carbon, hydrogen, chlorine, nitrogen and sulfur contents of 20.5, 2.3, 35.1, 4.5 and 10.8 percent, respectively, as compared with the theoretical contents of 20.0, 2.1, 35.6, 4.7 and 10.7 percent, respectively, calculated for the above named structure.

EXAMPLE IV 2,3,5,6-tetrachloro-4-pyridine sulfonic acid: 4-chlorophenyl ester

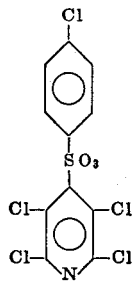

To an agitated solution containing 4.1 grams (0.032 mole) of 4-chlorophenol in 50 milliliters of carbon tetrachloride was added 2.5 grams of pyridine. Thereafter, a solution containing 10 grams (0.032 mole) of 2,3,5,6-tetrachloro-4-pyridine sulfonyl chloride in 50 milliliters of carbon tetrachloride was slowly added thereto. The mixture was heated under reflux conditions (86° C.) for 3 hours. The mixture was set aside and two layers formed; an oil layer on top and a carbon tetrachloride layer on the bottom. The oil layer was separated and the carbon tetrachloride layer cooled. The solid 2,3,5,6-tetrachloro-4-pyridine sulfonic acid; 4-chlorophenyl ester which separated from the carbon tetrachloride layer was recovered by filtration. The product melted at 106° C. and was recovered in a yield of 56.6 percent of theoretical. Upon analysis, the product was found to have carbon, hydrogen, chlorine, nitrogen and sulfur contents of 32.3, 0.9, 43.6, 3.4 and 7.5 percent, respectively, as compared with the theoretical contents of 32.5, 0.99, 43.5, 3.4 and 7.9 percent, respectively, calculated for the above named structure.

Following the general procedures as outlined hereinabove, the following compounds are prepared 2,3,5-trichloro-4-pyridine sulfonic acid: methyl ester having a molecular weight of 276.51;
2,3,5,6-tetrabromo-4-pyridine sulfonic acid: n-butyl ester having a molecular weight of 530.76
2,3,5-tribromo-4-pyridine sulfonic acid: cyclopropyl ester having a molecular weight of 435.91;
2,3,5,6-tetrachloro-4-pyridine sulfonic acid: sodium salt having a melting point of >250° C.
2,3,5,6-tetrachloro-4-pyridine sulfonic acid: potassium salt having a molecular weight of 335.06;
2,3,5-tribromo-4-pyridine sulfonic acid having a melting poin of >250° C.; and
2,3,5-trichloro-4-pyridine sulfonic acid: lithium salt having a molecular weight of 258.44.

In accordance with the present invention, it has been discovered that the pyridine sulfonic acid compounds can be employed for the control of various fungal, bacterial and plant pests. For such uses, the compounds can be employed in an unmodified form or dispersed on a finely divided solid and employed as a dust. Such mixtures can also be dispersed in water with or without the aid of a surface active agent and the resulting aqueous suspension or dispersion employed as a spray. In other procedures, the compounds can be employed as the active constituent in solvent solutions, oil-in-water or water-in-oil emulsions. The augmented compositions are adapted to be formulated as concentrates and subsequently diluted with additional liquid or solid adjuvants to produce the ultimate treating compositions.

The exact concentration of the toxicant to be employed in the treating compositions is not critical and may vary considerably provided the required dosage of the effective agent is supplied. The concentration of toxicant in liquid compositions generally is from about 0.001 to about 50 percent by weight. Concentrations up to about 95 percent by weight are oftentimes conveniently employed, particularly in concentrate compositions. In dusts, the concentrations of the toxicants can be from about 0.1 to 95 percent by weight. For use as a spray, it is often convenient to apply the compounds as wettable powders.

In a representative operation, 2,3,5,6-tetrachloro-4-pyridine sulfonic acid: 4-chlorophenyl ester when employed, as the sole toxicant, in an aqueous dispersion at a concentration of 100 parts of the compound per million parts of the ultimate dispersion, was found to give 100 percent control of the tobacco blank shank causative organism.

In another representative operation, 2,3,5,6-tetrachloro-4-pyridine sulfonic acid when employed, as the sole toxicant, in an aqueous dispersion at a concentration of 400 parts by weight of the compound per million parts of the ultimate dispersion was found to give substantially complete kill and control of causative organism of apple scab.

In other operations, each of the compounds, 2,3,5,6-tetrachloro-4-pyridine sulfonic acid and 2,3,5,6-tetrabromo-4-pyridine sulfonic acid: sodium salt was found to give inhibition of the growth of the organism Bacillus subtilis when either of the compounds were employed, as the sole toxicant, in a nutrient agar at a concentration of about 500 parts by weight of the compound per million parts of agar; 2,3,5-trichloro-4-pyridine sulfonic acid was found to give inhibition of the growth of the organism Staphylococcus aureus when employed, as the sole toxicant, in a nutrient agar at a concentration of about 500 parts by weight of the compounds per million parts of agar. 2,3,5,6-tetrachloro-4-pyridine sulfonic acid: 4-chlorophenyl ester was found to give inhibition or complete control of the growth of the organisms Staphylcoccus aureus, Trichophyton mentagrophytes, Bacillus subtilis, Mycobacterium phlei and Trichoderm sp. Madison P–42 when employed, as the sole toxicant at a concentration of about 500 parts by weight of the compound per million parts of agar.

In another operation, 2,3,5-trichloro-4-pyridine sulfonic acid when applied, as the sole toxicant, in an aqueous dispersion at a concentration of 4,000 parts of the compound per million parts of the ultimate dispersion, was found to give 100 percent kill and control of emergent seedlings of wild oats, yellow foxtail, barnyard grass, crabgrass, pigweed, bindweed, velvet leaf and beans.

In other operations 2,3,5,6-tetrachloro-4-pyridine sulfonic acid: sodium salt and 2,3,5,6-tetrachloro-4-pyridine sulfonic acid: 4-chlorophenyl ester each are found to give substantially complete kill and control of emergent seedlings of crabgrass when either one is applied, as the sole toxicant, in an aqueous dispersion at a concentration of 4,000 parts of the compound per million parts of the ultimate dispersion. Also, 2,3,5-tribromo-4-pyridine sulfonic acid was found to give substantially complete kill and control of emergent seedlings of yellow foxtail, crabgrass and bindweed.

In another operation, 2,3,5-trichloro-4-pyridine sulfonic acid was found to totally prevent pigweed seeds from germinating when applied, as the sole toxicant, in an aqueous dispersion at a concentration equivalent to 20 pounds of the compound per acre.

When applied at a dosage level of from about 1 to about 10,000 parts per million by weight or more, each of the compounds of the present invention, the utility of which is not specifically recited hereinabove, has the ability to kill, inhibit or otherwise control one or more of the above said fungal, bacterial or plant pests.

PREPARATION OF STARTING MATERIALS

The polyhalo pyridine compounds containing an alkali metal mercapto group in the 4-ring position and employed as starting materials are known compounds and can be prepared by the reaction of a polyhalo pyridine containing a halogen atom in the 4-ring position with an alkali metal sulfide in the presence of a reaction medium such as methanol, isopropanol, triethylamine, dimethoxymethane or the like. The reaction is carried out under atmospheric pressure at temperatures of from about minus 50° C. to about 100° C., for a period of up to one hour.

The polyhalo pyridine compounds containing a mercapto group in the 4-ring position and employed as starting materials in the present invention are known compounds and can be prepared by mixing the alkali metal mercapto compound, prepared as above, with a concentrated mineral acid such as hydrochloric acid, to convert the alkali metal salt to the corresponding —SH compound. These above preparations are similar to those taught in U.S. Pats. 3,296,272 and 3,639,413.

The polyhalopyridine sulfonyl chloride employed as starting materials are known compounds and can be prepared as taught in U.S. Pat. 3,635,044.

What is claimed is:

1. A compound corresponding to the formula

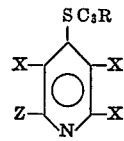

wherein X represents chloro or bromo; Z represents hydrogen, chloro or bromo and R represents hydrogen, alkali metal, loweralkyl of 1 to 4 carbon atoms, phenyl or chlorophenyl with the proviso that when Z is chloro, R is other than hydrogen.

2. A compound as defined in claim 1 wherein R is alkali metal.

3. A compound as defined in claim 1 wherein R is chlorophenyl.

4. The compound of claim 2 which is 2,3,5-trichloro-4-pyridine sulfonic acid.

5. The compound of claim 2 which is 2,3,5-tribromo-4-pyridine sulfonic acid.

6. The compound of claim 3 which is 2,3,5,6-tetrachloro-4-pyridine sulfonic acid: sodium salt.

7. The compound of claim 3 which is 2,3,5,6-tetrabromo-4-pyridine sulfonic acid: sodium salt.

8. The compound of claim 4 which is 2,3,5,6-tetrachloro-4-pyridine sulfonic acid: 4-chlorophenyl ester.

References Cited

FOREIGN PATENTS 564,786  11/1932  Germany _____ 260—294.8 F

OTHER REFERENCES

Ager et al.: Journal of the Chemical Society, Part "C" Organic, pp. 1530–36 (1970).

ALAN L. ROTMAN, Primary Examiner

U.S. Cl. X.R.

260—294.8 F; 424—263

PO-1050
(5/69)

UNITED STATES PATENT OFFICE
CERTIFICATE OF CORRECTION

Patent No. 3,801,582   Dated April 2, 1974

Inventor(s) Penelope B. Domenico

It is certified that error appears in the above-identified patent and that said Letters Patent are hereby corrected as shown below:

Column 1, line 57, after "example" change the period "." to a comma ",";

Column 1, line 71, correct spelling of "substituent";

Column 2, line 71, the compound name should read "2,3,5,6--tetrachloro-4-mercaptopyridine.";

Column 4, line 14, correct spelling of "point";

Column 6, line 10, the formula should appear as follows:

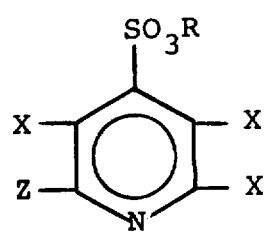

Signed and sealed this 5th day of November 1974.

(SEAL)
Attest:

McCOY M. GIBSON JR.
Attesting Officer

C. MARSHALL DANN
Commissioner of Patent